United States Patent
Yamamoto et al.

(10) Patent No.: US 7,216,736 B2
(45) Date of Patent: May 15, 2007

(54) VIBRATION SUPPRESSION DEVICE OF POWER TRAIN

(75) Inventors: Koichi Yamamoto, Hiroshima (JP); Yuzou Ohkawa, Hiroshima (JP); Eiji Mito, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 343 days.

(21) Appl. No.: 10/895,108

(22) Filed: Jul. 21, 2004

(65) Prior Publication Data

US 2005/0029036 A1 Feb. 10, 2005

(30) Foreign Application Priority Data

Aug. 6, 2003 (JP) .............................. 2003-287585

(51) Int. Cl.
- B60K 5/04 (2006.01)
- F01P 9/00 (2006.01)
- F16H 57/04 (2006.01)
- F01M 5/00 (2006.01)

(52) U.S. Cl. ...................... 180/297; 180/293; 180/300; 180/291; 123/41.01; 165/916; 74/606 A; 184/6.21; 184/6.22

(58) Field of Classification Search ................ 180/291, 180/293, 292, 297, 300, 312; 123/41.01; 165/916; 475/161; 74/606 A; 184/6.21, 184/6.22

See application file for complete search history.

(56) References Cited

U.S. PATENT DOCUMENTS

| | | | |
|---|---|---|---|
| 2,399,201 A * | 4/1946 | Buckendale et al. ...... | 74/665 R |
| 3,605,523 A * | 9/1971 | O'Brien ...................... | 475/234 |
| 4,530,518 A | 7/1985 | Newton | |
| 5,590,709 A * | 1/1997 | Tajima et al. ............... | 165/167 |
| 5,738,604 A * | 4/1998 | Dick ........................... | 475/206 |
| 5,797,450 A * | 8/1998 | Kawabe et al. ............. | 165/167 |
| 5,810,071 A * | 9/1998 | Pavlin ......................... | 165/284 |
| 6,260,373 B1 | 7/2001 | Rockwood | |
| 6,263,962 B1 * | 7/2001 | Komoda et al. ............ | 165/167 |
| 6,427,768 B2 * | 8/2002 | Komoda et al. ............ | 165/145 |
| 2001/0010262 A1 * | 8/2001 | Komoda ...................... | 165/167 |
| 2002/0129926 A1 * | 9/2002 | Yamaguchi .................. | 165/41 |
| 2003/0146034 A1 * | 8/2003 | Gassmann et al. .......... | 180/248 |

FOREIGN PATENT DOCUMENTS

| | | |
|---|---|---|
| DE | 19547715 C1 | 5/1997 |
| DE | 19825738 C1 | 12/1999 |
| DE | 10052884 A1 | 5/2002 |
| EP | 0537927 | 4/1993 |
| EP | 551545 A1 * | 7/1993 |
| EP | 563951 A2 * | 10/1993 |
| GB | 1278330 | 6/1972 |
| JP | 63120937 | 5/1988 |
| JP | 10291423 | 4/1998 |
| JP | 10-291423 | 11/1998 |

* cited by examiner

Primary Examiner—Christopher P. Ellis
Assistant Examiner—John R. Olszewski
(74) Attorney, Agent, or Firm—Nixon Pebody LLP; Donald R. Studebaker

(57) ABSTRACT

A heat exchanger, which performs heat exchanging between a lubricating oil circulating within a transfer device disposed behind an engine and an engine coolant, also functions as a mass member of a dynamic damper. The heat exchanger is disposed at an upper face of a transfer case via a resilient member. Herein, the resilient member is comprised of a first metal plate, a second metal plate, and a rubber member interposed between the first and second metal plates, and there are provided lubricating passages flowing within the resilient member. Accordingly, there can be provided the vibration suppression device of the power train that can suppress vibration properly regardless of the temperature changing and advantage the weight reduction without requiring any new disposition space.

13 Claims, 7 Drawing Sheets

VIBRATION SUPPRESSION DEVICE OF POWER TRAIN

BACKGROUND OF THE INVENTION

The present invention relates to a vibration suppression device of a power train including an engine mounted on a vehicle body and belongs to a technical field of a vibration suppression of a motor vehicle.

A four-wheel drive vehicle is normally equipped with a transfer device to transfer engine power derived from an engine to front and rear wheels respectively. The transfer device of the four-wheel drive vehicle whose engine is disposed in a vehicle width direction generally comprises an input shaft extending in the vehicle width direction and inputting the engine power from a front engine via a transmission, an output shaft extending backward of the vehicle with crossing the input shaft at a right angle, a bevel gear provided between the input and output shafts, and a case storing these shafts and bevel gear and including a journal to support the above-described output shaft.

In such a structure where the transfer device as a mass is located behind the engine, vibration is generated around an engine axis of the engine resiliently mounted on the vehicle body, and it induces vibration of the transfer device in a vertical direction. As a result, there may occur a problem that such vibration transfers to the vehicle body and causes unpleasant noise in a vehicle compartment.

One of methods to solve this problem is disclosed in, for example, Japanese Patent Laid-Open Publication No. 10-291423 (see page 6, FIG. 5). Namely, the method is that there is provided a dynamic damper at an extension housing which is attached to the transfer device and extends backward of the vehicle and this dynamic damper suppresses vibration of the transfer device and/or a power train.

Herein, the dynamic damper is normally configured of a resilient member and a mass member, and it is attached to the transfer device such that the mass member is mounted on it via the resilient member. Further, the resilient member is located under a in a position where the temperature changes greatly, for example, near an exhaust manifold or an exhaust gas purification device. Accordingly, the resilient members are exposed to severe temperature-changes, and thus a resilience of the resilient member also changes according to the temperature change. As a result, the resonance frequency of the dynamic damper changes to a high frequency when it becomes hard under a relatively low temperature circumstance, while it changes to a low frequency when it becomes soft under a relatively high temperature circumstance. However, the dynamic dumper is originally designed so as to provide its substantially constant resonance frequency which is equivalent to a peak frequency of the vibration of the power train when the power train generates its greatest vibration to be suppressed. Accordingly, if the resilience of the resilient member changes, the resonance frequency of the dynamic damper also changes from the above-described peak frequency. As a result, there is a problem that the vibration of the transfer and/or the power train may not be suppressed properly.

Further, in the case where there is newly provided the dynamic damper described in the above patent publication, there are such other problems that a trial of weight reduction of the vehicle body may he disadvantaged by adding an additional weight of the dynamic damper newly provided, and an additional space may be required in order that the dynamic damper is disposed in a narrow space.

SUMMARY OF THE INVENTION

The present invention has been devised in view of the above-described problems, and an object of the present invention is to provide a vibration suppression device of a power train that can suppress vibration properly regardless of the temperature change and advantage the weight reduction without requiring a new disposition space.

The above-described object can be solved by the following present invention.

The present invention provides a vibration suppression device of a power train, comprising a power train including an engine which is resiliently mounted on a vehicle body, a specified structure body constituting part of the power train, a dynamic damper mounted on the specified structure body, which is configured of a mass member and a resilient member, wherein the resilient member of the dynamic damper has a passage which is formed therein so as to circulate a lubricating oil for lubricating an inside of the specified structure body or an engine coolant for cooling the engine of the power train within the resilient member.

According to the present invention, since the lubrication oil or the engine coolant which have relatively great thermal capacity flow within the resilient member, temperature changing of the resilient member can be suppressed properly even under the circumstance where the temperature changes greatly, thereby stabilizing the resonance frequency of the dynamic damper. Accordingly, the resonance frequency of the dynamic damper can be set substantially at the peak frequency of the power train when the power train generates its greatest vibration, and thus the vibration suppression device to suppress the vibration properly can be achieved.

Next, the present invention provides a vibration suppression, wherein the mass member of the dynamic damper comprises a heat exchanger which performs heat exchange between the lubricating oil for lubricating the inside of the specified structure body and the engine coolant for cooling the engine of the power train, and the passage formed in the resilient member comprises a lubricating-oil passage which interconnects the heat exchanger and the inside of the specified structure body.

According to the present invention, since the heat exchanger which is normally indispensable to be installed functions as a mass member constituting the dynamic damper, no new dynamic damper need be provided is. Accordingly, the weight reduction can be achieved and no new disposition space is required.

Also, the present invention of provides a vibration suppression device, wherein the lubricating-oil passage is configured such that a portion thereof to supply an lubricating oil from the inside of the specified structure body to the heat exchanger is formed at a central portion of the resilient member, whereas a portion thereof to return the lubricating oil from the heat exchanger to the inside of the specified structure body is formed at a peripheral portion of the resilient member.

According to the present invention, since the passage through which the heat-exchanged oil flows down is formed at the peripheral portion of the resilient member, a contact area of the lubricating oil with the resilient member can be enlarged preferably, thereby suppressing more properly the temperature changing of the resilient member.

Further, the present invention provides a vibration suppression device, wherein the resilient member of the dynamic damper comprises a first metal plate which contacts with the mass member, a second metal plate which contacts with the specified structure body, and a rubber member which is interposed between the both metal plates.

According to the present invention, since the resilient member is formed in three-layer structure comprising the first metal plate, the rubber member and the second metal plate, designing flexibility of the resilient member increases. Namely, it can be easy to adjust the mass of the dynamic damper properly by, for example, changing a diameter or a thickness of the first metal plate which functions as the mass member of the dynamic damper. Accordingly, its wide use can be improved and the vibration can be suppressed more effectively.

Also, the present invention provides a vibration suppression device, wherein a boss is provided at one of the first and second metal plates, whereas a hole is provided at the other of the first and second metal plates, and the boss is inserted in the hole.

According to the present invention, since the first metal plate and the second metal plate are engaged with each other by relationships of the boss and the hole, any one of the metal plates can be prevented from being moved improperly in a lateral direction by the other of the metal plates even in the event that a lateral force acts from outside. Accordingly, a searing force acting on the rubber member interposed between the metal plates is reduced properly, and thus the durability of the rubber member can be maintained and a preferable resilient member can be materialized.

Further, the embodiment of the present invention described above has substantially the same structures as the previously described embodiment. Accordingly, these also perform similar functions and effects to the above, respectively.

Also, the present invention provides the vibration suppression device, wherein the resilient member of the dynamic damper is placed on an upper face of the specified structure body.

Herein, in the event that the resilient member is placed at a lower face of the specified structure body, there is a possibility that the resilient member may be damaged due to spattered stones or the like, resulting in a leakage of the lubricating oil flowing within the resilient member. According to the present invention, however, since the resilient member is protected properly against the spattered stones or the like by the specified structure body, the above-described problem can be solved effectively.

Further, the present invention provides the vibration suppression device, wherein the specified structure body is configured of a transfer device which comprises an input shaft inputting an engine power from the engine, an output shaft extending in a longitudinal direction of a vehicle with crossing the input shaft at a substantially right angle, a bevel gear provided between the input and output shafts, and a case storing the shafts and the bevel gear and including a journal to support the output shaft.

According to this embodiment of the present invention, similar functions to the above-described embodiments of the present invention can be obtained even in the event that the transfer device is disposed behind the engine with an offset layout.

Further, the present invention provides the vibration suppression device, wherein the mass member of the dynamic damper comprises a heat exchanger which performs a heat exchanging between the lubricating oil for lubricating the inside of the specified structure body and the engine coolant for cooling the engine of the power train, the passage formed in the resilient member comprises a lubricating-oil passage which interconnects the heat exchanger and the inside of the specified structure body, and the heat exchanger is located above the journal of the case of the transfer device such that the lubricating oil which has been heat-exchanged at the heat exchanger is supplied to the journal of the case.

Generally, a specific portion of the transfer device which requires a sufficient cooling by the lubricating oil is the journal for the output shaft because it is apt to heat. According to the present invention, however, since the heat exchanger is located in a portion of the case which corresponds to this journal, the cooled lubricating oil which has been heat-exchanged at the heat exchanger can be supplied to the journal, thereby providing proper cooling. Also, since the above-described journal is located at a rear end portion of the transfer device, the vibration, of course, can be suppressed effectively by disposing the heat exchanger as the mass member of the dynamic damper at this portion.

Further, the present invention provides a vibration suppression device of a power train, comprising a power train including an engine which is resiliently mounted on a vehicle body, a transfer device including an input shaft inputting an engine power from the engine of the power train, an output shaft extending in a longitudinal direction of a vehicle with crossing the input shaft at a substantially right angle, a bevel gear provided between the input and output shafts, and a case storing the both shafts and the bevel gear and including a journal to support the output shaft, a dynamic damper mounted on an upper face of the transfer device so as to suppress vibration of the power train and/or the transfer device, which comprises a rubber member functioning as a resilient member thereof and a heat exchanger functioning as a mass member thereof which is supported via the rubber member on the transfer device, wherein the heat exchanger of the dynamic damper performs heat exchanging between a lubricating oil for lubricating an inside of the transfer device and a coolant for cooling the lubricating oil, and the rubber member of the dynamic damper has oil passages which are formed separately therein so as to supply the lubricating oil from the transfer device to the heat exchanger and return the lubricating oil from the heat exchanger to the transfer device, respectively.

Since the above noted embodiment of the present invention comprises substantially the constitutions of the previous embodiments described above, it can perform such functions and effects as the above.

DETAILED DESCRIPTION OF THE INVENTION

Hereinafter, a power train of a four-wheel drive vehicle according to a preferred embodiment of the present invention will be described.

Figure 1:
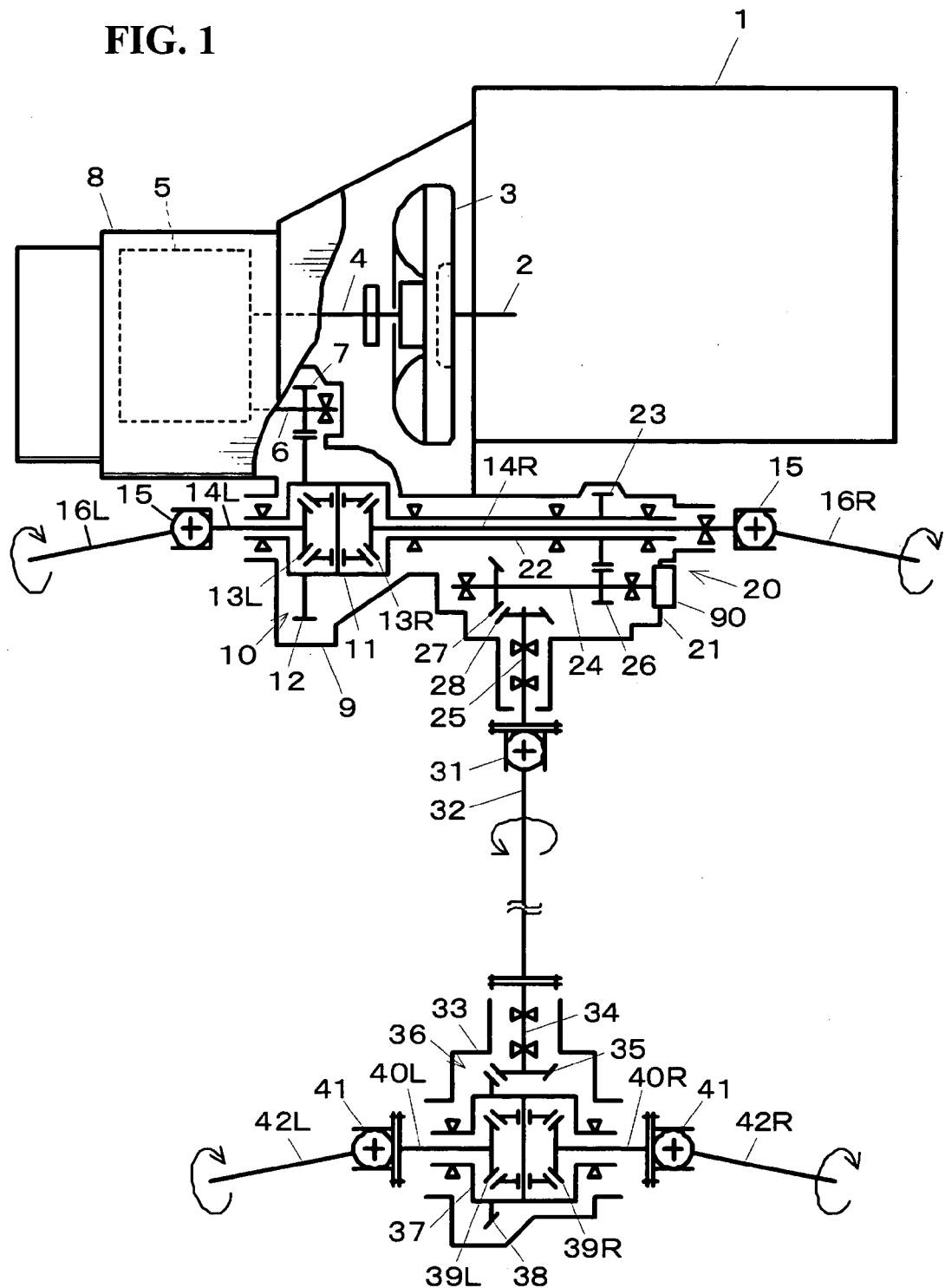
FIG. 1 is a skeleton diagram showing a power train of a four-wheel drive vehicle according to a preferred embodiment of the present invention.

As shown in FIG. 1, this four-wheel drive vehicle is a vehicle whose engine 1 is disposed in a vehicle width direction in an engine room which is provided at a front side of a vehicle body. Herein, a crankshaft 2 of the engine 1 extends in the vehicle width direction, a torque converter 3 is coupled to the crankshaft 2, and a transmission 5 is coupled to a turbine shaft 4 of the torque converter 3. An output shaft 6 of the transmission 5 also extends in the vehicle width direction and is provided with an output gear 7.

The above-described torque converter 3 and the transmission 5 are stored in a case 8 which is coupled to the engine 1. The case 8 is provided with a front-differential storage portion 9 which extends backward, and a front differential 10 is stored in the storage portion 9.

The front differential 10 comprises a differential case 11, a ring gear 12, and right-and-left pinion gears 13L, 13R. Herein, the differential case 11 is rotatably supported at the front-differential storage portion 9, and the ring gear 12 in the differential case 11 is engaged with the output gear 8. The right-and-left pinion gears 13L, 13R are stored in the differential case 11.

Right-and-left front-wheel drive shafts 14L, 14R, which extend in the vehicle width direction, are coupled to respective pinion gears 13L, 13R, and also coupled to right-and-left front-wheel axles 16L, 16R respectively via universal joints 15, 15.

Figure 2:
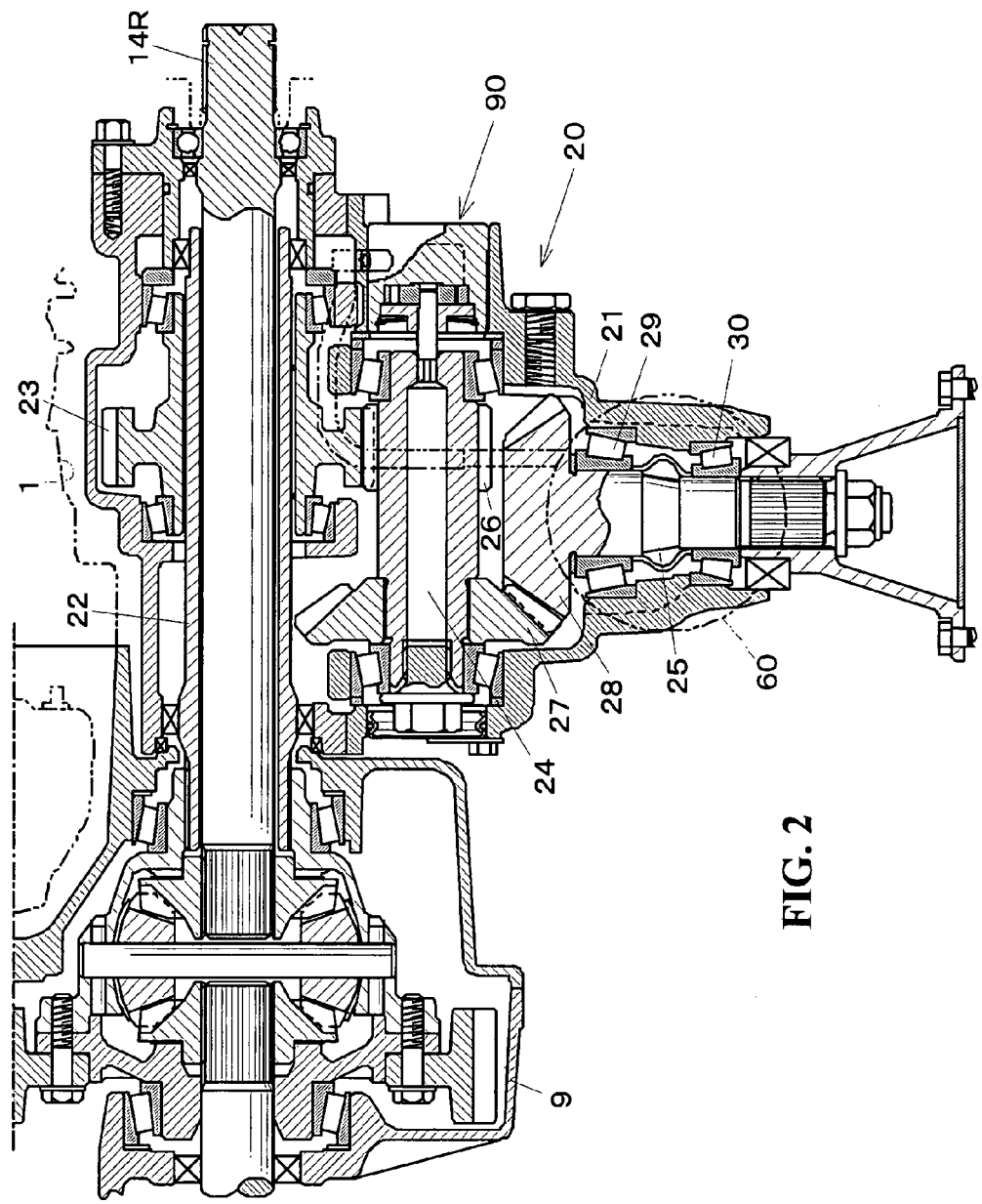
FIG. 2 is a sectional view of a transfer device and its circumference.

As shown in FIGS. 1 and 2, a transfer device 20 is connected with a right-side face of the front differential storage portion 9. The transfer device 20 comprises a transfer case 21, a transfer input shaft 22 extending in the vehicle width direction, a drive gear 23, an idle shaft 24 extending in the vehicle width direction, a transfer output shaft 25 extending in a longitudinal direction of the vehicle crossing the idle shaft 24, a driven gear 26, a drive bevel gear 27, a driven bevel gear 28, and journals 29, 30. Herein, the transfer case 21 supports rotatably the right front-wheel drive shaft 14R, the transfer input shaft 22, the idle shaft 24, and the transfer output shaft 25. Further, the drive gear 23 is fixed on the transfer input shaft 22, which is engaged with the driven gear 26 fixed on the idle shaft 24. Also, the drive bevel gear 27 fixed to the idle shaft 24 is engaged with the driven bevel gear 28 fixed to a frond end of the transfer output shaft 25 which is rotatably supported on the couple of journals 29, 30, and these gears 27, 28 constitute a bevel gear mechanism.

As shown in FIG. 1, a propeller shaft 32 is coupled to a rear end of the transfer output shaft 25 via a universal joint 31. A rear differential storage case 33 is provided behind the propeller shaft 32. The case 33 rotatably supports a pinion shaft 34 which is connected with a rear end of the propeller shaft 32, and stores a rear differential 36 for rear wheels which is engaged with a drive bevel gear 35 fixed at a rear end of the pinion shaft 34.

The rear differential 36 comprises a differential case 37, a driven bevel gear 38, and right-and-left pinion gears 39L, 39R. Herein, the differential case 37 is rotatably supported at the rear-differential storage portion 33, and the driven bevel gear 38 in the differential case 37 is engaged with the drive bevel gear 35. The right-and-left pinion gears 39L, 39R are stored in the differential case 37.

Right-and-left rear-wheel drive shafts 40L, 40R, which extend in the vehicle width direction, are coupled to respective pinion gears 39L, 39R, and also coupled to right-and-left rear-wheel axles 42L, 42R respectively via universal joints 41, 41.

According to the above-described structure, the front wheels are driven by the right-and-left front-wheel drive axels 14L, 14R and the engine power is transferred to the rear wheels via the transfer device 20. Herein, triangles in FIG. 1 denote journals.

Figure 3:
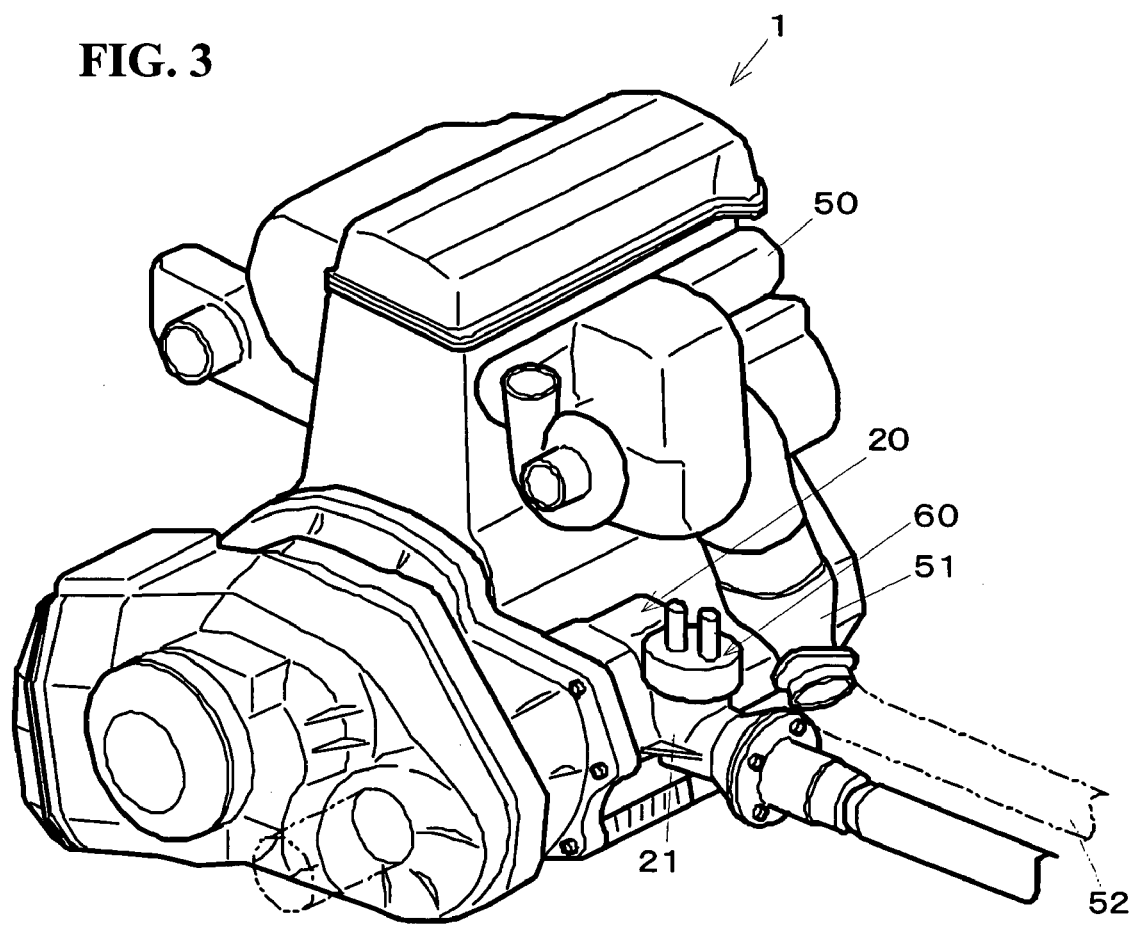
FIG. 3 is a perspective view of an engine and the transfer device and its circumference.

The engine 1 is a type of engine whose exhaust manifold 50 is provided at a backside of the engine 1 as shown in FIG. 3. An exhaust gas purification device 51 is connected with a rear end of the manifold 50 and its end extends close to the transfer device 20 and is coupled to an exhaust pipe 52. A heat exchanger 60 is provided on an upper face of the transfer case 21 (see also FIG. 2).

Figure 4:
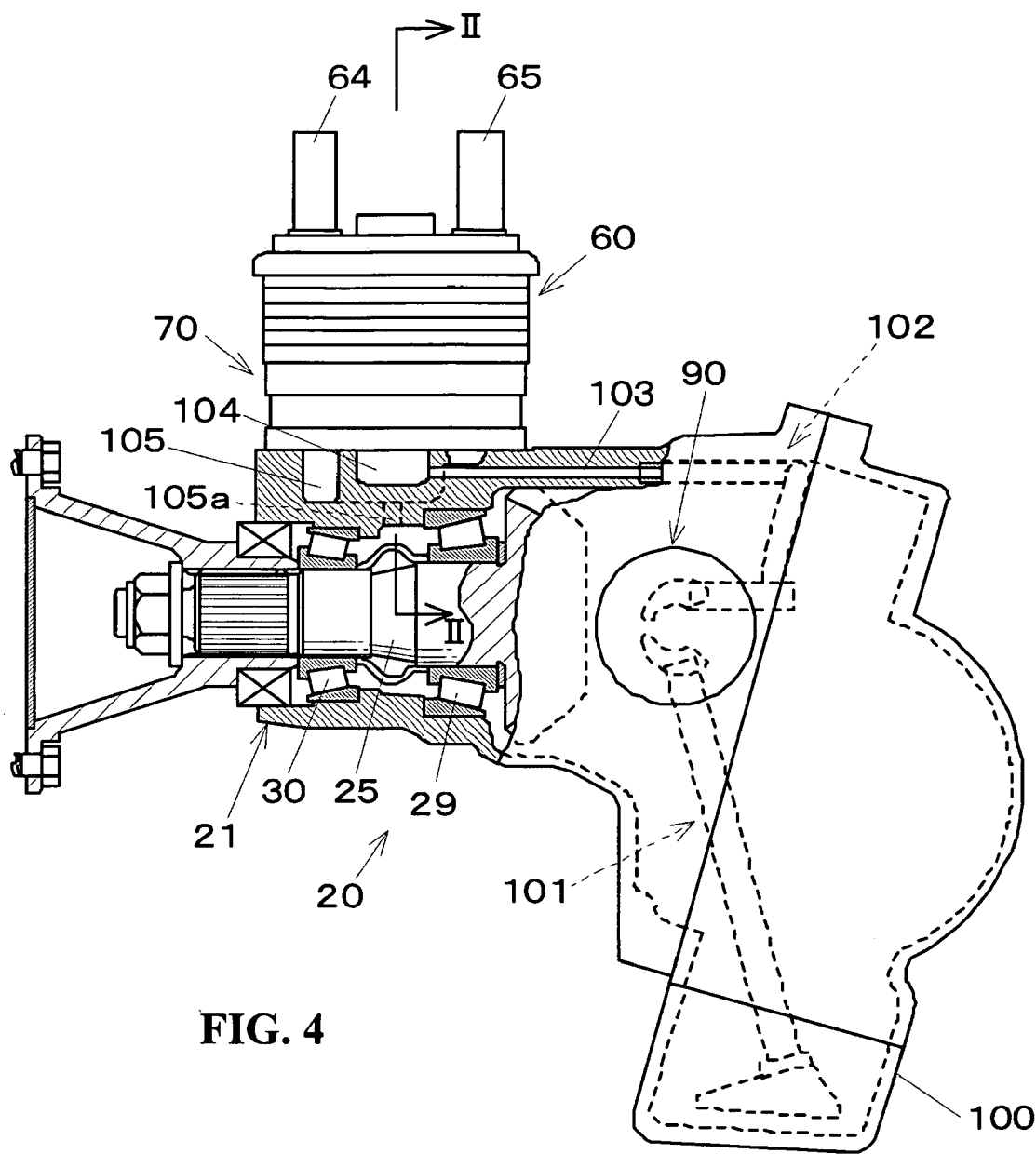
FIG. 4 is a partially broken side view of the transfer device and its circumference.
Figure 5:
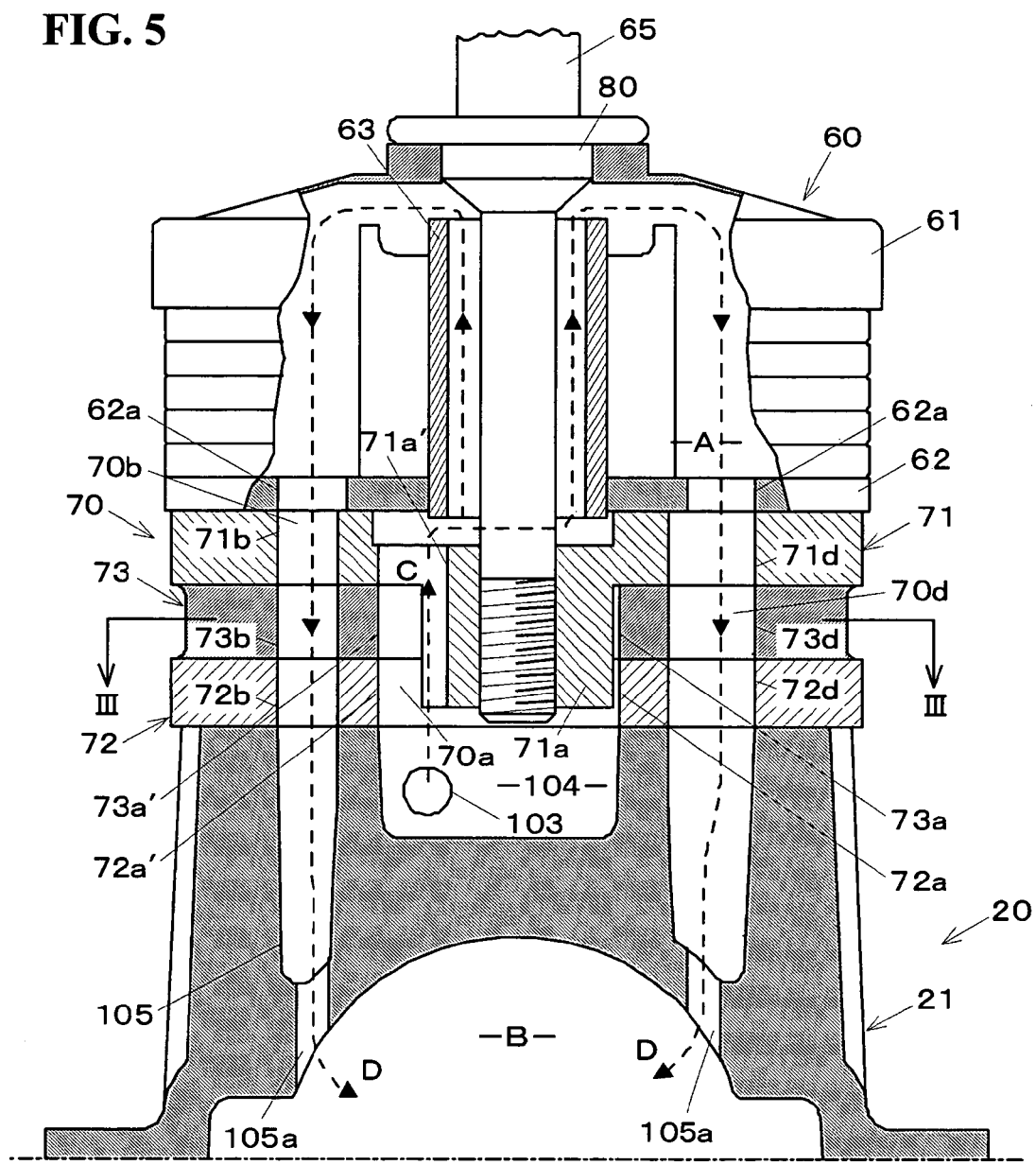
FIG. 5 is a sectional view of a major part taken on line II—II of FIG. 4.

The heat exchanger 60 functions as an oil cooler to cool a lubricating oil supplied to the transfer device 20, which is a type of cooler to use an engine cooling water as an coolant. As shown in FIGS. 4 and 5, the heat exchanger 60 is provided on the upper face of the transfer case 21 of the transfer device 20.

The heat exchanger 60 comprises a body 61, a bottom plate 62 disposed below the body 61, and a cylinder 63 which stands at the center of the bottom plate 62 so as to penetrate the bottom plate 62 and includes plural fins. Four holes 62a . . . 62a (only two of them are illustrated in FIG. 5) are formed at specified portions on a peripheral portion of the bottom plate 62, which open to an inside space A of the body 61. There are provided a supply pipe 64 and an exhaust pipe 65 for the coolant at an upper face of the body 61, and the coolant circulates in a passage not illustrated in the body 61.

A resilient member 70 has an unique structure and, as shown in FIG. 5, comprises a first metal plate 71 contacting at a lower face of the heat exchanger 60, a second metal plate 72 contacting at the transfer case 21, and a rubber member 73 having a resiliency which is interposed between the both metal plates 71, 72. Herein, the rubber member 73 is fixed integrally to the both metal plates 71, 72 by a baking process.

Figure 6:
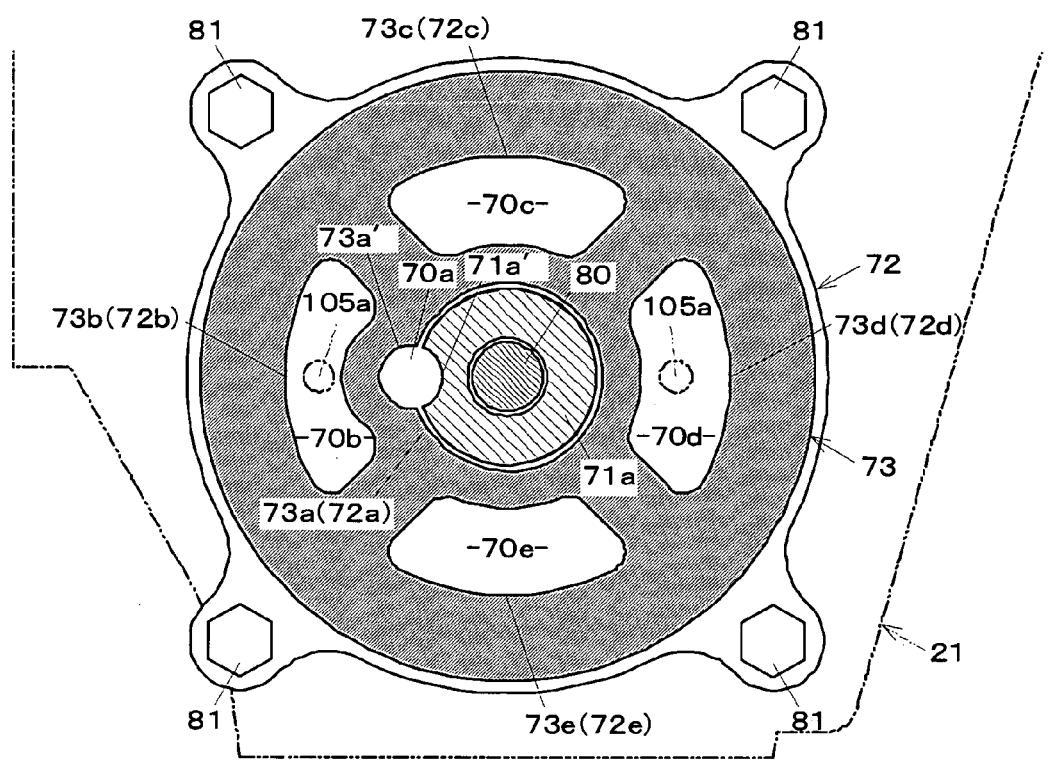
FIG. 6 is a sectional view of a major part taken on line III—III of FIG. 5.

As shown in FIGS. 5 and 6, there is provided a boss 71a which protrudes downward at the central portion of the disc-shaped first metal plate 71, and there are provided holes 72a, 73a at the central portions of the substantially disc-shaped second metal plate 72 and the disc-shaped rubber member. The boss 71a is inserted in the holes 72a, 73a.

Further, an arc-shaped notch is formed at part of an outer peripheral face of the boss 71a of the first metal plate, and also arc-shaped notched are formed at part of inner peripheral faces of the second metal plate 72 and the rubber member 73. These notches 71a', 72a', 73a' constitute a lubricating oil passage 70a with a circular cross section which penetrates near the central portion of the resilient member 70 in the vertical direction.

Also, there are respectively provided four holes 71b–71e, 72b–72e, 73b–73e at peripheral portions of the first metal plate 71, the second metal plate 72 and the rubber member 73 so as to connect with each other and extend in the vertical direction (two holes 71c, 71e of the first metal plate 71 are not illustrated in drawings). These holes 71b–71e, 72b–72e, 73b–73e constitute four lubricating passages 70b–70e which extend in the vertical direction at a specified portion of the peripheral portion of the resilient member 70 so as to penetrate the resilient member 70. Herein, the passage 70b illustrated on the left has a slightly different sectional shape from other passages 70c–70e and its relatively small sectional area because of the passage 70a disposed close to the passage 70b.

The heat exchanger 60 is fixed on the resilient member 70 by a single bolt 80 which is inserted into an inner space of the cylinder 63. Also, the resilient member 70 is fixed to the transfer case 21 via the second metal plate 72 by four bolts 81 ... 81.

Further, as shown in FIG. 4, there is provided a trochoid type of oil pump 90 to supply the lubricating oil to the heat exchanger 60 in the transfer case 21 so as to be coaxial with the idle shaft 24 (see also FIGS. 1 and 2).

Also, an oil pan 100 to reserve a specified amount of lubricating oil is provided below the transfer case 21. There are provided a first oil passage 101 which connect the oil pan 100 with the oil pump 90 and a second oil passage 102 which connect the oil pump 90 with the heat exchanger 60 in a space of the transfer case 21.

On a upper wall portion of the transfer case 21, as shown in FIGS. 4 and 5, a third oil passage 103 is formed so as to connect with the above-described second passage 102. The passage 103 is provided to open at a portion of the upper face of the transfer case 21 which is right below the heat exchanger 60 and connect with an intake port 104 leading to the lubricating oil passage 70a of the resilient member 70.

Also, on the upper face of the transfer case 21, there is provided an exhaust port 105 connecting with the lubricating oil passages 70b–70e of the resilient member 70, which is a groove of a ring shape. Two passages 105a, 105a are formed at the bottom face of the exhaust port 105, which connect with an inner space B of the transfer case 21 (see also FIG. 6).

According to the structure described above, when the oil pump 90 operates, as shown in FIG. 4, the lubricating oil in the oil pan 100 flows in the oil pump 90 via the first oil passage 101. The flowing-in lubricating oil then flows into the heat exchanger 60 from the oil pump 90 via the second and third oil passages 102, 103.

Herein, as shown in FIG. 5, the lubricating oil flowed into the intake port 104 from the third oil passage 103 flows via the lubricating oil passage 70a formed within the resilient member 70 as illustrated by an arrow C. Subsequently, it flows from the lower opening of the cylinder 63 through the inner space of the cylinder 63, and then goes through the inner space A of the body 61 of the heat exchanger 60. At this moment, the lubricating oil is cooled when getting through the fins of cylinder 63 that has been cooled by the coolant which is supplied via the supply pipe 64 and exhausted via the exhaust pipe 65. Then, the cooled lubricating oil flows from the inner space A in the body 61 of the heat exchanger 60 into the lubricating oil passages 70b–70e in the resilient member 70, and then goes through the exhaust port 105 and passages 105a, 105a and leads to the inner space B of the transfer case 21 as illustrated by an arrow D.

Meanwhile, when vibration is generated around the crankshaft 2 of the engine 1, it induces vibration of the rear end of the transfer device 20 in the vertical direction. However, as shown in FIGS. 2 through 4, since the heat exchanger 60 functioning as the mass member of the dynamic damper is provided on the upper face of the transfer case 21 of the transfer device 20 which is disposed behind the engine 1, the vibration can be suppressed properly.

Further, as shown in FIGS. 5 and 6, since there are provided the lubricating oil passages 70a–70e to supply the lubrication oil circulating in the transfer device 20 within the resilient member 70, the lubricating oil which has relatively great thermal capacity flows within the resilient member 70. Accordingly, temperature changing of the resilient member 70, specifically the rubber member 73, which is located near the exhaust manifold 50 and the exhaust gas purification device 51 can be properly suppressed, thereby stabilizing the resonance frequency of the dynamic damper including the heat exchanger 60 as the mass member thereof. Thus, the resonance frequency of the dynamic damper can be set substantially at the peak frequency of the power train when the power train generates its greatest vibration, and thereby the vibration suppression device to suppress the vibration properly can be materialized.

Figure 7:
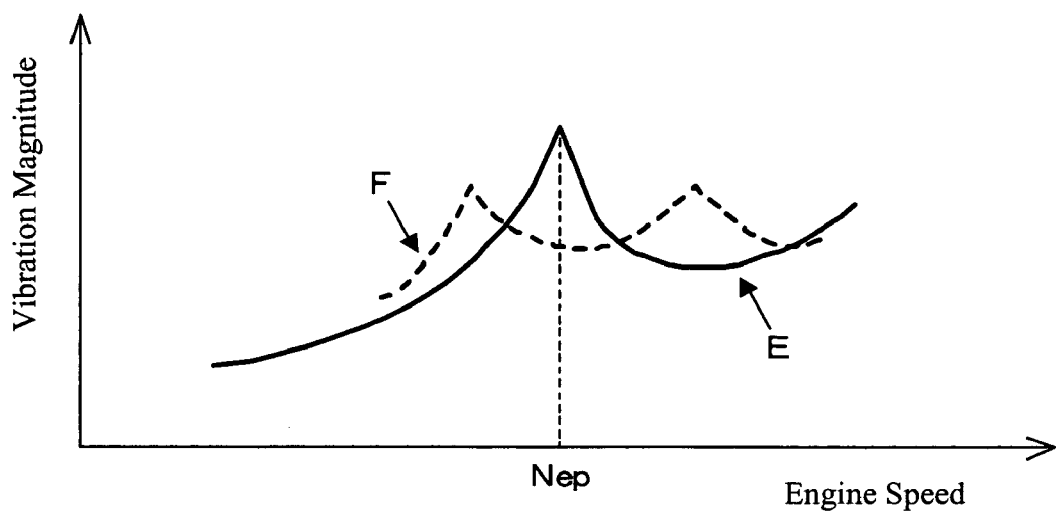
FIG. 7 is a schematic diagram for explaining an effect of an dynamic damper.

Namely, even under the circumstance that the end of the power train, i.e., the rear end of the transfer device 20 may vibrate with showing its peak magnitude of vibration at an engine speed Nep as shown by a solid line E in FIG. 7, the resonance frequency of the dynamic dumper can be always set at a specified frequency which corresponds to the above-described peak magnitude of vibration, i.e. the peak frequency, according to the present embodiment. Thus, the vibration can be suppressed properly and the peak of the magnitude vibration can be split and reduced as shown by a dotted line F.

Further, since the heat exchanger 60 which is normally indispensable to be installed functions as the mass member constituting the dynamic damper, no new dynamic damper need be provided. Accordingly, the weight reduction can be achieved and no new disposition space is required.

Also, as shown in FIGS. 5 and 6, the lubricating oil passage 70a which supplies the lubricating oil from the transfer device 20 to the heat exchanger 60 as shown by the arrow C is located near the central portion of the resilient member 70, while the four lubricating passages 70b–70e which supply the lubricating oil from the heat exchanger 60 to the transfer device 20 as shown by the arrow D are located at the peripheral portion of the resilient member 70. Accordingly, the contact area of the heat-exchanged lubricating oil flowing down in the passages 70b–70e with the resilient member 70, specifically the rubber member 73 can be enlarged preferably, thereby suppressing more properly the temperature changing of the rubber member 73.

Further, since the resilient member 70 is formed in a three-layer structure comprising the first metal plate 71, the rubber member 73 and the second metal plate 72, designing flexibility of the resilient member 70 increases. Namely, it can be easy to properly adjust the mass of the dynamic damper by, for example, changing a diameter or a thickness of the first metal plate 71 which functions as the mass member of the dynamic damper. Accordingly, its wide use can be more certainly improved and the vibration can be suppressed.

Also, since the first metal plate 71 and the second metal plate 72 are engaged with each other by relationships of the boss 71a and the hole 72a, any one of the metal plates 71, 72 can be prevented from being moved improperly in the lateral direction by the other of the metal plates 71, 72 even in the event that the lateral force acts from outside. Accordingly, the hearing force acting on the rubber member 73 interposed between the metal plates 71, 72 is reduced properly, and thus the durability of the rubber member 73 can be maintained and the preferable resilient member 70 can be materialized.

Also, as shown in FIG. 4, since the heat exchanger 60 is placed on the upper face of the transfer case 21, the resilient member 70 can be protected properly against the spattered stones or the like by the transfer case 21, and thereby the hurting of the resilient member 70, specifically the rubber member 73 due to spattered stones or the like can be avoided. Thus, there may be no leakage of the lubricating oil due to the hurting of the rubber member 73.

Further, since the heat exchanger 60 is placed at the upper face of the transfer case 21 which is located right above the journals 29, 30 for the transfer output shaft 25 which is apt to heat, the distance between the heat exchanger 60 and the journals 29, 30 is relatively small. As a result, the lubricating oil cooled at the heat exchanger 60 can be effectively supplied to the journals 29, 30 to cool the journals 29, 30 and its vicinity properly.

Herein, although the present embodiment uses the lubricating oil which flows within the resilient member 70, the engine coolant may be used instead of the lubricating oil. In this case, since the engine coolant having a relatively great thermal capacity flows within the resilient member 70, specifically the rubber member 73, the same function as the above can be attained as well.

Also, the present invention may be applied to a RR (Rear-engine Rear-drive) vehicle instead of the FF (Front-engine Front drive) vehicle of the present embodiment. The present invention should not limited to the above-described embodiment, but any other modifications can be adopted within the scope of the present invention.

As described above, according to the present invention, there can be provided the vibration suppression device of the power train that can suppress vibration properly regardless of the temperature changing and advantage the weight reduction without requiring any new disposition space. Namely, the present invention relates to the vibration suppression device of the power train including the engine mounted on the vehicle body, and thus it can be applied widely in a field of vibration suppression for the motor vehicle.

What is claimed is:

1. A vibration suppression device of a power train, comprising:
   a power train including an engine which is resiliently mounted on a vehicle body;
   a specified structure body comprising said power train partially;
   a dynamic damper mounted on said specified structure body, which is comprised of a mass member and a resilient member, the mass member being resiliently mounted on the specified structure body via the resilient member and a resonance frequency of the dynamic damper being set substantially at a peak frequency of said power train so that the dynamic damper can suppress a vibration of said power train;
   wherein said resilient member of the dynamic damper has a passage which is formed therein so as to circulate a lubricating oil for lubricating an inside of said specified structure body within said resilient member.

2. The vibration suppression device of a power train of claim 1, wherein said mass member of the dynamic damper comprises a heat exchanger which performs heat exchanging between said lubricating oil for lubricating the inside of the specified structure body and an engine coolant for cooling the engine of the power train, and said passage formed in said resilient member comprises a lubricating-oil passage which interconnects said heat exchanger and said body.

3. The vibration suppression device of a power train of claim 2, wherein said lubricating-oil passage is configured such that a portion thereof to supply an lubricating oil from said inside of the specified structure body to said heat exchanger is formed at a central portion of the resilient member, whereas a portion thereof to return the lubricating oil from said heat exchanger to said inside of the specified structure body is formed at a peripheral portion of the resilient member.

4. The vibration suppression device of a power train of claim 3, wherein said resilient member of the dynamic damper comprises a first metal plate which contacts with said mass member, a second metal plate which contacts with said specified structure body, and a rubber member which is interposed between said both metal plates.

5. The vibration suppression device of a power train of claim 4, wherein a boss is provided at one of said first and second metal plates, whereas a hole is provided at the other of said first and second metal plates, and said boss is inserted in said hole.

6. The vibration suppression device of a power train of claim 2, wherein said resilient member of the dynamic damper comprises a first metal plate which contacts with said mass member, a second metal plate which contacts with said specified structure body, and a rubber member which is interposed between said both metal plates.

7. The vibration suppression device of a power train of claim 6, wherein a boss is provided at one of said first and second metal plates, whereas a hole is provided at the other of said first and second metal plates, and said boss is inserted in said hole.

8. The vibration suppression device of a power train of claim 1, wherein said resilient member of the dynamic damper is placed on an upper face of said specified structure body.

9. The vibration suppression device of a power train of claim 8, wherein said specified structure body comprises a transfer device which comprises an input shaft inputting an engine power from the engine, an output shaft extending in a longitudinal direction of a vehicle so as to have substantially a right angle with respect to said input shaft, a bevel gear provided between said input and output shafts, and a case storing said shafts and said bevel gear and including a journal to support said output shaft.

10. The vibration suppression device of a power train of claim 9, wherein said mass member of the dynamic damper comprises a heat exchanger which performs a heat exchanging between said lubricating oil for lubricating the inside of the specified structure body and an engine coolant for cooling the engine of the power train, said passage formed in said resilient member comprises a lubricating-oil passage which interconnects said heat exchanger and said inside of the specified structure body, and said heat exchanger is located above said journal of the case of the transfer device such that said lubricating oil which has been heat-exchanged at said heat exchanger is supplied to said journal of the case.

11. The vibration suppression device of a power train of claim 1, wherein said specified structure body comprises a transfer device which comprises an input shaft inputting an engine power from the engine, an output shaft extending in a longitudinal direction of a vehicle so as to have substantially a right angle with respect to said input shaft, a bevel gear provided between said input and output shafts, and a case storing said shafts and said bevel gear and including a journal to support said output shaft.

12. The vibration suppression device of a power train of claim 11, wherein said mass member of the dynamic damper comprises a heat exchanger which performs a heat exchanging between said lubricating oil for lubricating the inside of the specified structure body and an engine coolant for cooling the engine of the power train, said passage formed in said resilient member comprises a lubricating-oil passage which interconnects said heat exchanger and said inside of the specified structure body, and said heat exchanger is located above said journal of the case of the transfer device such that said lubricating oil which has been heat-exchanged at said heat exchanger is supplied to said journal of the case.

13. A vibration suppression device of a power train, comprising:

a power train including an engine which is resiliently mounted on a vehicle body;

a transfer device including an input shaft inputting an engine power from the engine of said power train, an output shaft extending in a longitudinal direction of a vehicle so as to have substantially a right angle with respect to said input shaft, a bevel gear provided between the input and output shafts, and a case storing the both shafts and the bevel gear and including a journal to support the output shaft;

a dynamic damper mounted on an upper face of said transfer device so as to suppress vibration of said power train, which comprises a rubber member functioning as a resilient member thereof and a heat exchanger functioning as a mass member thereof which is resiliently supported via the rubber member on said transfer device;

wherein said heat exchanger of the dynamic damper performs heat exchanging between a lubricating oil for lubricating an inside of said transfer device and a coolant for cooling the lubricating oil, and said rubber member of the dynamic damper has oil passages which are formed separately therein so as to supply the lubricating oil from said transfer device to said heat exchanger and return the lubricating oil from said heat exchanger to said transfer device, respectively.

* * * * *